(12) United States Patent
Nitta

(10) Patent No.: US 12,141,638 B2
(45) Date of Patent: Nov. 12, 2024

(54) RFID LABEL AND METHOD OF USING RFID LABEL

(71) Applicant: SATO HOLDINGS KABUSHIKI KAISHA, Tokyo (JP)

(72) Inventor: Haruhiko Nitta, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/041,173

(22) PCT Filed: Sep. 15, 2021

(86) PCT No.: PCT/JP2021/033936
§ 371 (c)(1),
(2) Date: Feb. 9, 2023

(87) PCT Pub. No.: WO2022/065159
PCT Pub. Date: Mar. 31, 2022

(65) Prior Publication Data
US 2024/0028861 A1  Jan. 25, 2024

(30) Foreign Application Priority Data

Sep. 23, 2020 (JP) ................................. 2020-158778

(51) Int. Cl.
*G06K 19/077* (2006.01)

(52) U.S. Cl.
CPC ... *G06K 19/07722* (2013.01); *G06K 19/0776* (2013.01)

(58) Field of Classification Search
CPC ......... G06K 19/07772; G06K 19/0776; G06K 19/07; G06K 19/067; G06K 19/00

USPC ................................. 235/492, 380, 487, 375
See application file for complete search history.

(56) References Cited

U.S. PATENT DOCUMENTS

| | | | |
|---|---|---|---|
| 10,311,355 B1 * | 6/2019 | Hahn ............... | G06K 19/07771 |
| 2001/0014377 A1 * | 8/2001 | Babb ............... | G06K 19/07749 |
| | | | 428/68 |
| 2006/0255945 A1 * | 11/2006 | Egbert ............ | G06K 19/07771 |
| | | | 340/572.7 |
| 2011/0147467 A1 | 6/2011 | Choi | |
| 2011/0309937 A1 * | 12/2011 | Bunza .................... | A61B 5/202 |
| | | | 340/573.5 |
| 2012/0055998 A1 * | 3/2012 | Mieslinger ............... | H04B 5/43 |
| | | | 235/492 |
| 2016/0064814 A1 * | 3/2016 | Jang .................... | H05K 9/0075 |
| | | | 174/377 |

(Continued)

FOREIGN PATENT DOCUMENTS

| | | |
|---|---|---|
| JP | 2004-317544 A | 11/2004 |
| JP | 2004-348675 A | 12/2004 |

(Continued)

*Primary Examiner* — Edwyn Labaze
(74) *Attorney, Agent, or Firm* — Foley & Lardner LLP

(57) ABSTRACT

An RFID label includes: an RFID inlay having an inlay substrate, an RFID antenna formed on a part of the inlay substrate, and an IC chip connected to the RFID antenna; a label substrate laminated on one surface of the RFID inlay via a lamination adhesive layer; and an adherend adhesive layer formed on the other surface of the RFID inlay, in which a shielding layer containing a conductive material is formed on at least a part of a region other than the RFID antenna of the inlay substrate.

12 Claims, 13 Drawing Sheets

(56) References Cited

U.S. PATENT DOCUMENTS

2017/0040665 A1* 2/2017 Takashima ........... H01Q 1/2291
2021/0383182 A1* 12/2021 Chai ....................... B32B 27/12

FOREIGN PATENT DOCUMENTS

| JP | 2005-309612 A | 11/2005 | |
|---|---|---|---|
| JP | 2009-098494 A | 5/2009 | |
| KR | 101185350 B1 * | 9/2012 | ......... G06K 19/0776 |

* cited by examiner

RFID LABEL AND METHOD OF USING RFID LABEL

TECHNICAL FIELD

The present invention relates to an RFID label and a method of using the RFID label.

BACKGROUND ART

In the related art, there has been proposed a method of using a label in which in a label on which information on an adherend is printed in advance, when the information is updated or information is added, information printed on a label attached to the adherend cannot be used by attaching a label on which the updated information is printed on the label attached to the adherend in an overlapping manner (refer to JP 2009-98494 A).

In JP 2009-98494 A, a label on which a barcode including the updated information is printed is attached in an overlapping manner so as to cover a barcode printed on the attached label, whereby the barcode on the attached label cannot be read. Accordingly, the information on the adherend can be updated.

SUMMARY OF INVENTION

In recent years, in fields of manufacture, management, distribution, and the like of products, RFID media such as RFID tags and RFID labels, which correspond to a radio frequency identification (RFID) technology for transmitting and receiving information by non-contact communication from an IC chip in which information related to products and identification information are written, have been widespread.

The RFID label is read by non-contact communication. For this reason, when the method of using a label described in JP 2009-98494 A is applied to the RFID label, a plurality of RFID labels are present in an adherend, and any of the RFID labels may not be read, or information of an RFID label different from a desired RFID label may be read.

Therefore, an object of the present invention is to make only a new RFID label including other information readable when the RFID label including the other information is attached to an adherend to which an RFID label has already been attached.

According to an aspect of the present invention, there is provided an RFID label includes: an RFID inlay having an inlay substrate, an RFID antenna formed on a part of the inlay substrate, and an IC chip connected to the RFID antenna; a label substrate laminated on one surface of the RFID inlay via a lamination adhesive layer; and an adherend adhesive layer formed on the other surface of the RFID inlay, in which a shielding layer containing a conductive material is formed on at least a part of a region other than the RFID antenna of the inlay substrate.

According to an aspect of the present invention, a shielding layer containing a conductive material is formed on at least a part of a region other than the RFID antenna of the inlay substrate. For this reason, an RFID label is attached to an adherend so as to cover an RFID inlay of the attached RFID label with a shielding layer, and thus it is possible to read only the RFID label including other information.

DESCRIPTION OF EMBODIMENTS

[RFID Label]

Figure 1:
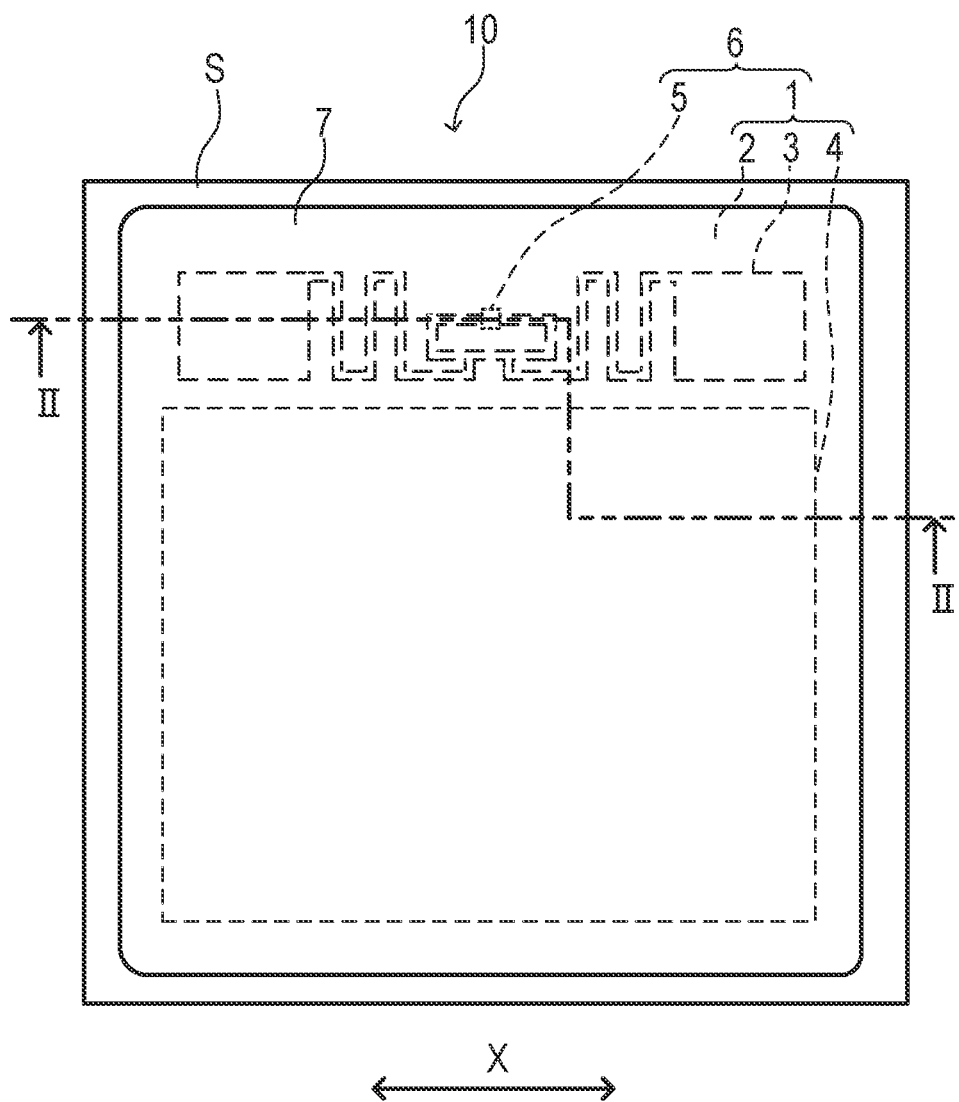
FIG. 1 is an external view of an RFID label according to an embodiment of the present invention.
Figure 2:
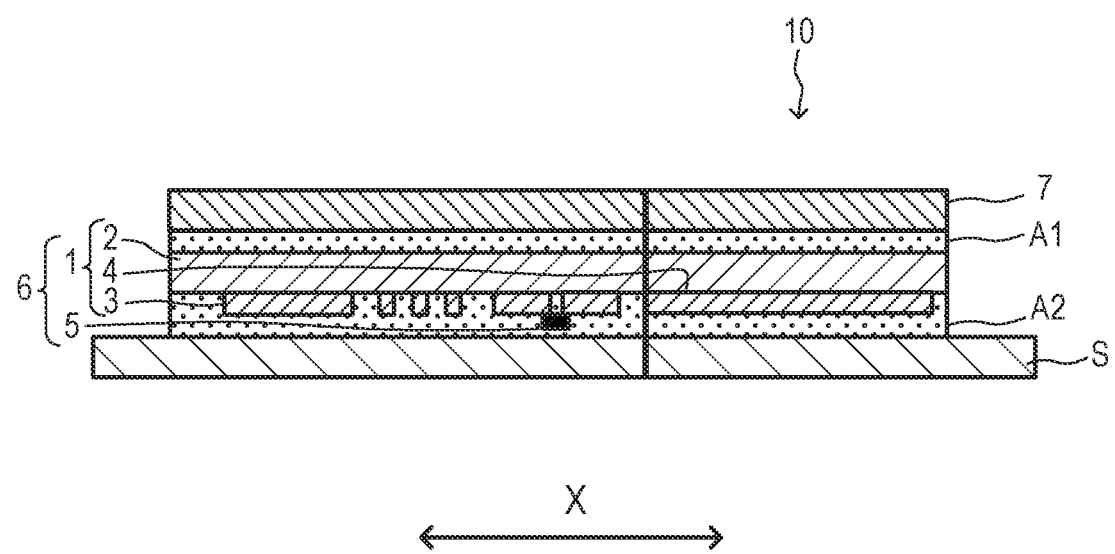
FIG. 2 is a cross-sectional view taken along a line II-II of FIG. 1.

FIG. 1 is an external view of an RFID label 10 according to an embodiment of the present invention. FIG. 2 is a cross-sectional view taken along a line II-II of FIG. 1.

Figure 3:
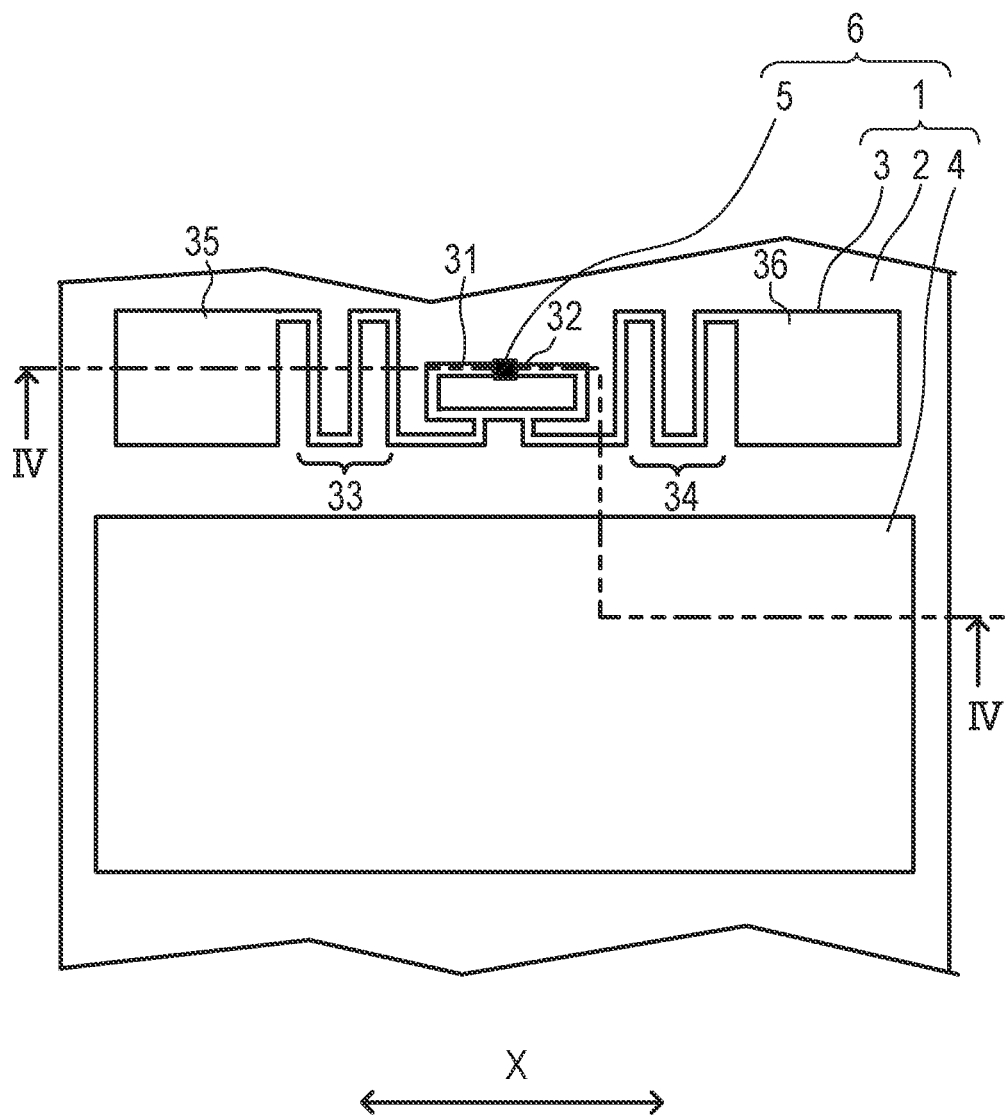
FIG. 3 is an external view illustrating an RFID inlay included in the RFID label.
Figure 4:
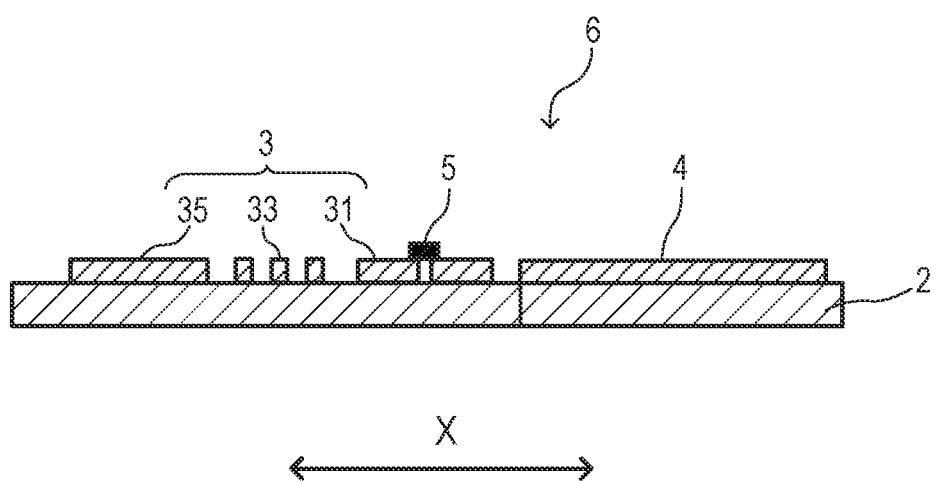
FIG. 4 is a cross-sectional view taken along a line IV-IV of FIG. 3.

FIG. 3 is an external view illustrating an RFID inlay 6 included in the RFID label 10, and FIG. 4 is a cross-sectional view taken along a line IV-IV of FIG. 3.

The RFID label 10 includes the RFID inlay 6 in which an IC chip 5 of RFID specification is connected to an antenna pattern 1.

The antenna pattern 1 includes an inlay substrate 2 (hereinafter referred to as a substrate 2), an RFID antenna 3 formed on the substrate 2, and a shielding layer 4 formed on the substrate 2.

The RFID antenna 3 is formed over a label width direction (an X direction in FIG. 1) of the RFID label 10.

The shielding layer 4 is formed of a material including a conductive material in a region other than the RFID antenna 3 of the substrate 2.

As shown in FIG. 2, the RFID label 10 includes a label substrate 7 which is laminated on a surface of the RFID inlay 6 opposite to a surface on which the IC chip 5 is disposed via a lamination adhesive layer (hereinafter, referred to as a first adhesive layer A1).

The RFID label 10 includes an adherend adhesive layer (hereinafter, referred to as a second adhesive layer A2) to be attached to an adherend on the surface on which the IC chip is disposed.

The label substrate 7 has, as an information recording surface, a printing surface on which information can be printed by a thermal method, a thermal transfer method, or the like.

A separator S is temporarily attached to the RFID label 10 via the second adhesive layer A2.

As a material applicable as the substrate 2, a single resin film such as polyvinyl chloride, polyethylene terephthalate, polypropylene, polyethylene, or polyethylene naphthalate, or a multilayer film obtained by laminating a plurality of these resin films may be used.

In the present embodiment, as the substrate 2, in addition to the resin film substrate, a paper substrate such as cardboard, high-quality paper, medium-quality paper, or coated paper obtained by forming a coating layer on these paper can be used. Thermal paper can also be used as the substrate 2.

In the present embodiment, a thickness of the substrate 2 may be 10 μm or more and 300 μm or less. When paper is used as the substrate 2, in the above range, the paper having a thickness of 50 μm or more and 260 μm or less can be used, and the thickness is preferably μm in general.

When a resin film is used as the substrate 2, in the above range, a resin film having a thickness of 25 μm or more and 200 μm or less, particularly 10 μm or more and 200 μm or less, may be used. These can be appropriately selected depending on the intended use.

The RFID antenna 3 can be formed of a conductive sheet containing a conductive material. As the conductive sheet, a metal foil can be used, and particularly, an aluminum or copper sheet can be used. The RFID antenna 3 may be printed on a predetermined region of the substrate 2 using conductive ink.

As shown in FIGS. 3 and 4, the RFID antenna 3 includes a loop portion 31, an IC chip connection portion 32 on which the IC chip 5 is mounted, meanders 33 and 34 extending symmetrically in the label width direction (the X direction) from the loop portion 31, and capacitance hats 35 and 36 connected to end portions of the meanders 33 and 34.

In the present embodiment, the RFID antenna 3 is, for example, a UHF band RFID antenna designed to have an antenna length and an antenna line width corresponding to a UHF band (300 MHz to 3 GHz, particularly 860 MHz to 960 MHz).

In addition, the RFID antenna 3 may be designed in a pattern corresponding to a specific frequency band such as a microwave (1 GHz to 30 GHz, particularly around 2.4 GHz) and an HF band (3 MHz to 30 MHz, particularly, around 13.56 MHz) according to the RFID specification.

In consideration of a thickness of the antenna pattern 1, a thickness of an RFID label manufactured using the antenna pattern 1, manufacturing cost, and the like, a thickness of the metal foil that can form the RFID antenna 3 is preferably set to 3 μm or more and 50 μm or less. In the present embodiment, an aluminum foil having a thickness of 20 μm is used as an example from a viewpoint of reducing the manufacturing cost.

Although not shown in the drawings, the RFID antenna 3 is bonded to the substrate 2 with the lamination adhesive layer made of an adhesive or a bonding agent of acrylic type, urethane type, silicone type, rubber type, or the like. That is, the first adhesive layer A1 can be used to attach the RFID antenna 3 to the substrate 2.

The shielding layer 4 has an effect of shielding radio waves, and is formed on a part of a region of the substrate 2 other than the region where the RFID antenna 3 is formed, and on the same surface as the RFID antenna 3.

For example, when the antenna pattern 1 is used for an RFID label, the shielding layer 4 is attached so as to overlap an inlay of the other RFID label previously attached to an adherend. Accordingly, communication between the previously attached RFID label and a reading device can be blocked.

The shielding layer 4 can be formed of a conductive sheet containing a conductive material as a material having an effect of shielding radio waves. As the conductive sheet, a metal foil, particularly an aluminum or copper sheet can be used. The shielding layer 4 may be printed on a predetermined region of the substrate 2 using conductive ink. The shielding layer 4 is preferably formed of the same material as that of the RFID antenna 3.

Accordingly, according to the RFID label including the shielding layer 4, since the shielding layer 4 is attached to the RFID inlay of the other RFID label already attached in an overlapping manner, it is impossible to read information stored in an IC chip of the other RFID label previously attached.

In the present embodiment, the IC chip 5 corresponds to the UHF band, and is a semiconductor package designed to be able to communicate with a reader (not shown) that is a reading device of the IC chip 5.

The IC chip 5 is electrically and mechanically connected to the IC chip connection portion 32 provided in a part of the loop portion 31 of the RFID antenna 3 with an anisotropic conductive material such as an anisotropic conductive bonding agent or an anisotropic conductive film.

In the RFID label 10, the label substrate 7 is attached to the surface of the substrate 2 opposite to the surface on which the IC chip 5 is mounted with the first adhesive layer A1. That is, the first adhesive layer A1 plays a role of laminating the label substrate 7 on the RFID inlay 6.

In addition, in the RFID label 10, the separator S is temporarily attached to the surface of the substrate 2 on which the IC chip 5 is mounted with the second adhesive layer A2. The RFID label 10 can be peeled off from the separator S and attached to the adherend with the second adhesive layer A2.

Effects

The RFID label 10 according to the present embodiment includes the shielding layer 4 having an effect of shielding radio waves. For this reason, when the shielding layer 4 of the RFID label 10 is attached in an overlapping manner so as to cover an RFID inlay of the other RFID label already attached to an adherend, information stored in an IC chip of the other RFID label cannot be read by a reading device.

The shielding layer 4 is formed in a region other than the region where the RFID antenna 3 is formed. For this reason, the RFID antenna 3 is not affected by the shielding layer 4. Therefore, the reading device can read only the information stored in the IC chip 5 connected to the RFID antenna 3.

[Method of Using RFID Label]

Next, a method of using the RFID label 10 will be described. FIGS. 5 to 8 illustrate the method of using the RFID label 10.

Figure 5:
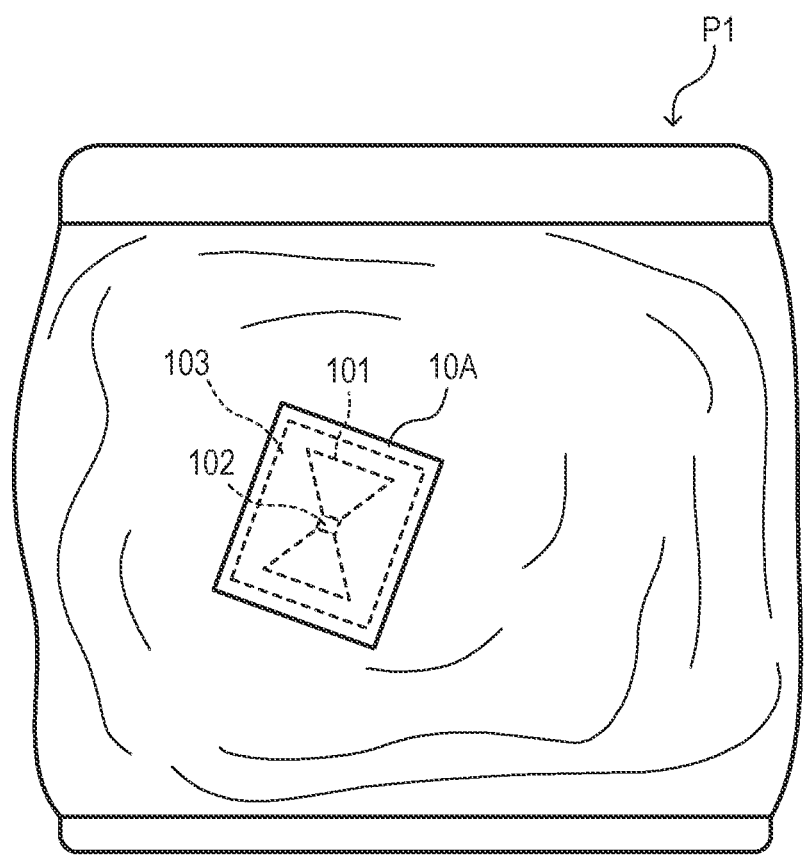
FIG. 5 is a schematic view illustrating a state in which a first RFID label is attached to a bag as an adherend.
Figure 6:
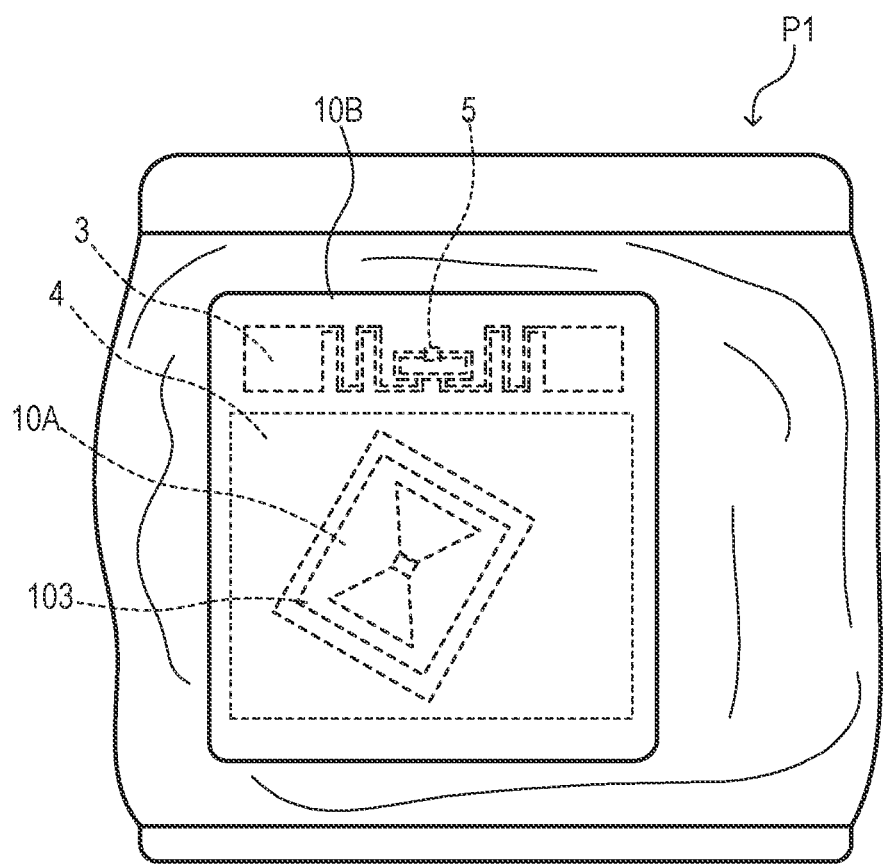
FIG. 6 is a schematic view illustrating a state in which a second RFID label is attached to the first RFID label of the bag in an overlapping manner.

FIG. 5 is a schematic view illustrating a state in which a first RFID label 10A is attached to a bag P1 as an adherend, and FIG. 6 is a schematic view illustrating a state in which a second RFID label 10B is attached to the first RFID label 10A of the bag P1 in an overlapping manner.

The first RFID label 10A shown in FIG. 5 is a general RFID label including an RFID inlay 103 having an RFID antenna 101 and an IC chip 102 connected to the RFID antenna 101. A second RFID label 10B shown in FIG. 6 corresponds to the RFID label 10.

In the method of using the RFID label 10 according to the present embodiment, as shown in FIG. 6, the second RFID label 10B is attached to the first RFID label 10A in an overlapping manner by covering the RFID inlay 103 of the first RFID label 10A with the shielding layer 4.

Accordingly, since radio waves reaching the RFID antenna 101 of the first RFID label 10A are shielded by the shielding layer 4, information stored in the IC chip 102 of the first RFID label 10A cannot be read by a reading device.

In the second RFID label 10B, the shielding layer 4 is formed in a region other than a region where the RFID antenna 3 is formed. For this reason, the RFID antenna 3 is not affected by the shielding layer 4. Therefore, the reading device can read only the information stored in the IC chip 5 connected to the RFID antenna 3.

Next, a case where an RFID label is applied to a test tube P2, as another form of the adherend, having a tubular shape will be described.

Figure 7:
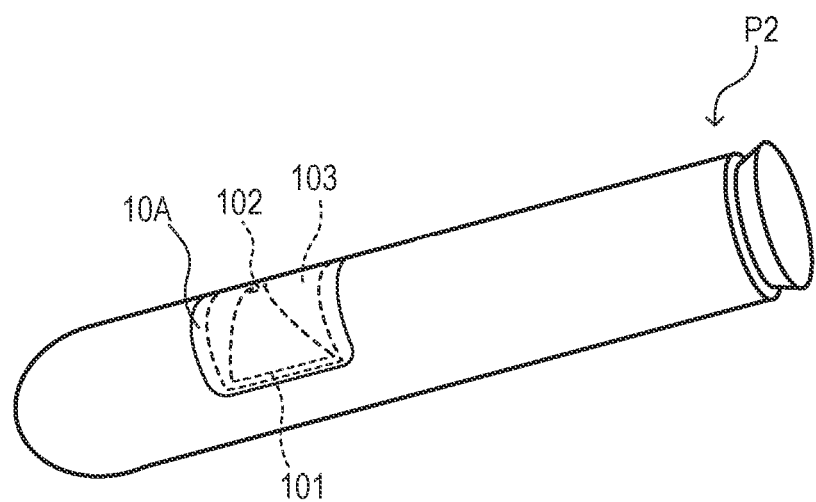
FIG. 7 is a schematic view illustrating a state in which the first RFID label is attached to a test tube having a tubular shape.
Figure 8:
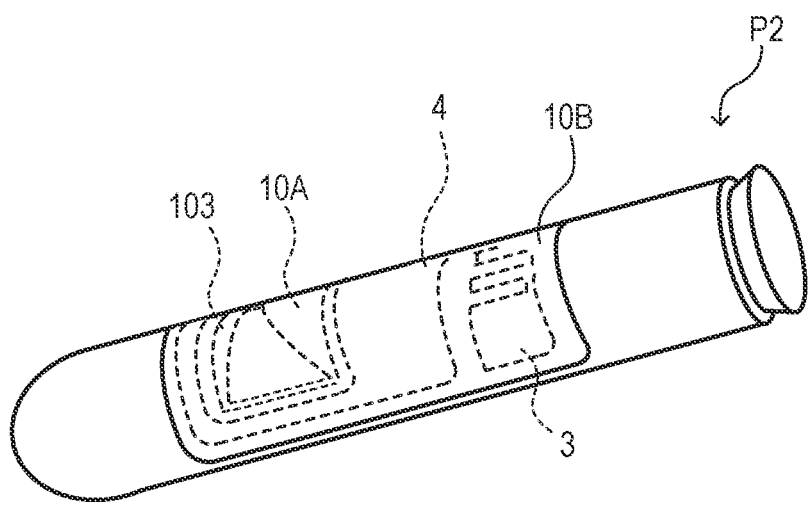
FIG. 8 is a schematic view illustrating a state in which the second RFID label is attached to the first RFID label of the test tube in an overlapping manner.

FIG. 7 is a schematic view illustrating a state in which the first RFID label 10A is attached to the test tube P2 having a tubular shape, and FIG. 8 is a schematic view illustrating a state in which the second RFID label 10B is attached to the first RFID label 10A of the test tube P2 in an overlapping manner.

In FIGS. 7 and 8, similarly to FIGS. 5 and 6, the first RFID label 10A is a general RFID label, and the second RFID label 10B corresponds to the RFID label 10.

In the method of using the RFID label 10 according to the present embodiment, as shown in FIG. 8, similarly to a tubular adherend such as the test tube P2, the second RFID label 10B is attached to the first RFID label 10A in an overlapping manner by covering the RFID inlay 103 of the first RFID label 10A with the shielding layer 4.

Accordingly, since the radio waves reaching the RFID antenna 101 of the first RFID label 10A are shielded by the shielding layer 4, the information stored in the IC chip 102 of the first RFID label 10A cannot be read by the reading device.

The shielding layer 4 of the second RFID label 10B is formed in a region other than the region where the RFID antenna 3 is formed. For this reason, the RFID antenna 3 is not affected by the shielding layer 4. Therefore, the reading device can read only the information stored in the IC chip 5 connected to the RFID antenna 3.

Modifications of RFID Label

First Modification

Figure 9:
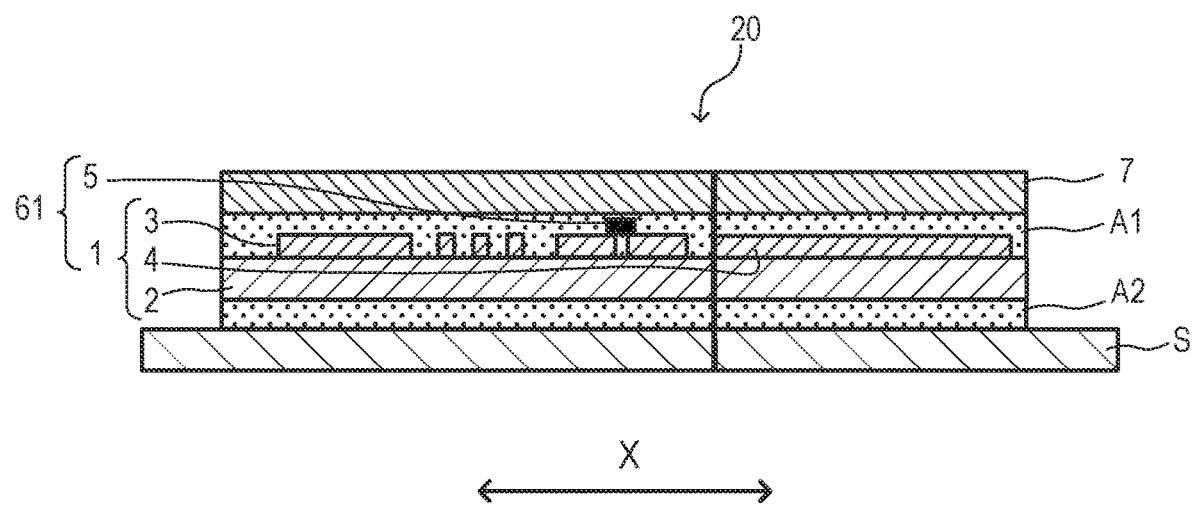
FIG. 9 is a cross-sectional view of an RFID label according to a first modification.

FIG. 9 is a cross-sectional view of an RFID label 20 according to a first modification.

In the first modification, a laminated structure is different from that of the RFID label 10, but an appearance of the RFID label 20 is the same as an appearance of the RFID label shown in FIG. 1. Therefore, the description of the appearance of the RFID label 20 is omitted. The cross-sectional view shown in FIG. 9 is a cross-sectional view in a case where the RFID label 20 is cut at the same position as the line II-II of the RFID label 10 shown in FIG. 1.

In the RFID inlay 61 of the RFID label 20 according to the first modification, a surface on which the label substrate 7 is laminated and a surface on which the second adhesive layer A2 is laminated are opposite to those of the RFID label 10.

That is, as shown in FIG. 9, in the RFID label 20, the label substrate 7 is laminated via the first adhesive layer A1 on a surface of the substrate 2 of the antenna pattern 1 on which the RFID antenna 3 is formed, and the second adhesive layer A2 is laminated on a surface opposite to a surface on which the antenna pattern 1 is formed. A separator S is temporarily attached to the RFID label 20 via the second adhesive layer A2.

In contrast to the RFID label 10, the RFID label 20 is attached to the adherend in a state in which a surface of the substrate 2 opposite to a surface on which the IC chip 5 is mounted faces the adherend.

The RFID label 20 according to the first modification includes the shielding layer 4 having an effect of shielding radio waves. For this reason, when the shielding layer 4 of the RFID label 20 is attached in an overlapping manner so as to cover an RFID inlay of the other RFID label already attached to the adherend, information stored in an IC chip of the other RFID label cannot be read by a reading device.

Second Modification

Figure 10:
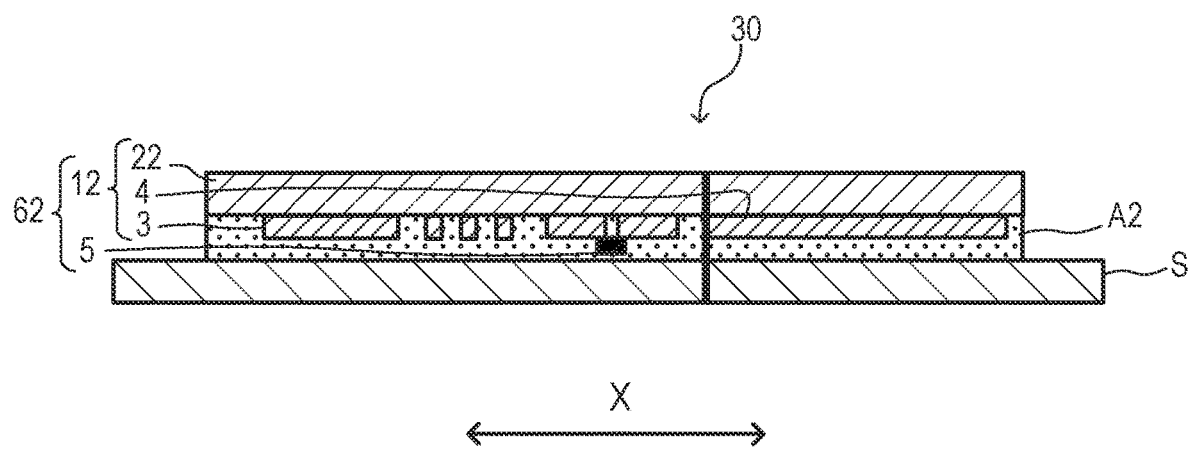
FIG. 10 is a cross-sectional view of an RFID label according to a second modification.

FIG. 10 is a cross-sectional view of an RFID label 30 according to a second modification.

The RFID label 30 of the second modification is different from the RFID label 10 in that the RFID label 30 does not include the label substrate 7.

The RFID label 30 is different from the RFID label 10 in a laminated structure of a label, but an appearance of the RFID label 30 is similar to the appearance of the RFID label shown in FIG. 1. Therefore, the description of the appearance of the RFID label 30 is omitted. The cross-sectional view shown in FIG. 10 is a cross-sectional view in a case where the RFID label 30 is cut at the same position as the line II-II of the RFID label 10 shown in FIG. 1.

The RFID label 30 includes an RFID inlay 62 in which the IC chip 5 of RFID specification is connected to an antenna pattern 12.

The antenna pattern 12 includes a substrate 22, and the RFID antenna 3 and the shielding layer 4 formed on the substrate 22, and a printing surface as an information recording surface is formed on the substrate 22 constituting the antenna pattern 12, and the RFID antenna 3 and the shielding layer 4 are formed on a surface opposite to the printing surface of the substrate 22.

On a surface of the substrate 22 on which the RFID antenna 3 is formed, a second adhesive layer A2 to be attached to an adherend is laminated and a separator S is temporarily attached via the second adhesive layer A2. Therefore, the RFID label 20 is attached to the adherend in a state in which a surface of the substrate 2 on which the RFID antenna 3 and the IC chip 5 are mounted faces the adherend.

The RFID label 30 according to the second modification includes the shielding layer 4 having an effect of shielding radio waves. For this reason, when the shielding layer 4 of the RFID label 30 is attached in an overlapping manner so as to cover an RFID inlay of the other RFID label already attached to the adherend, information stored in an IC chip of the other RFID label cannot be read by a reading device.

In addition, the RFID label 30 does not require the label substrate 7 by using the substrate 22 having an information recording surface. Accordingly, the manufacturing cost can be reduced.

Third Modification

Figure 11:
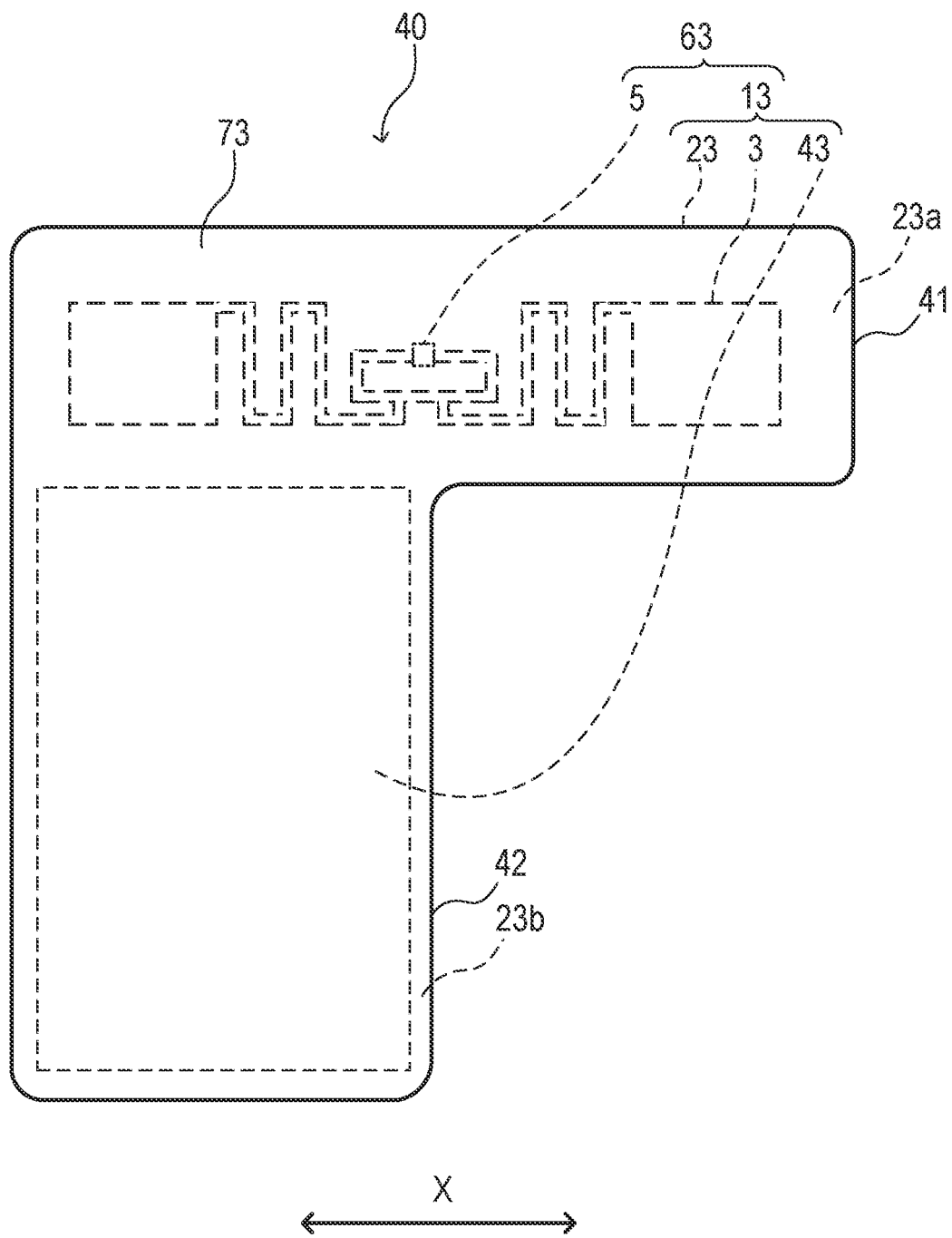
FIG. 11 is an external view of an RFID label according to a third modification.

FIG. 11 is an external view of an RFID label 40 according to a third modification.

An appearance shape of the RFID label 40 according to the third modification is different from that of the RFID label 10.

As shown in FIG. 11, the RFID label 40 of the third modification is formed in an L shape having a label base portion 41 on which the RFID antenna 3 is disposed, and a label narrow portion 42 formed to be narrower than the label base portion 41 in an X direction which is a label width direction.

The RFID label 40 according to the third modification includes an RFID inlay 63 in which the IC chip 5 of RFID specification is connected to an L-shaped antenna pattern 13.

The antenna pattern 13 includes an L-shaped substrate 23 having an inlay base portion 23a forming the label base portion 41 and an inlay narrow portion 23b forming the label narrow portion 42, the RFID antenna 3 formed on the inlay base portion 23a of the substrate 23, and the shielding layer 43 formed on the inlay narrow portion 23b of the substrate 23.

In the RFID label 40, a label substrate 73 having a shape corresponding to a shape of the RFID inlay 63 is laminated on one surface of the RFID inlay 63. Although not shown in FIG. 11, a second adhesive layer A2 to be attached to an adherend is laminated on the other surface of the RFID inlay 63.

Figure 12:
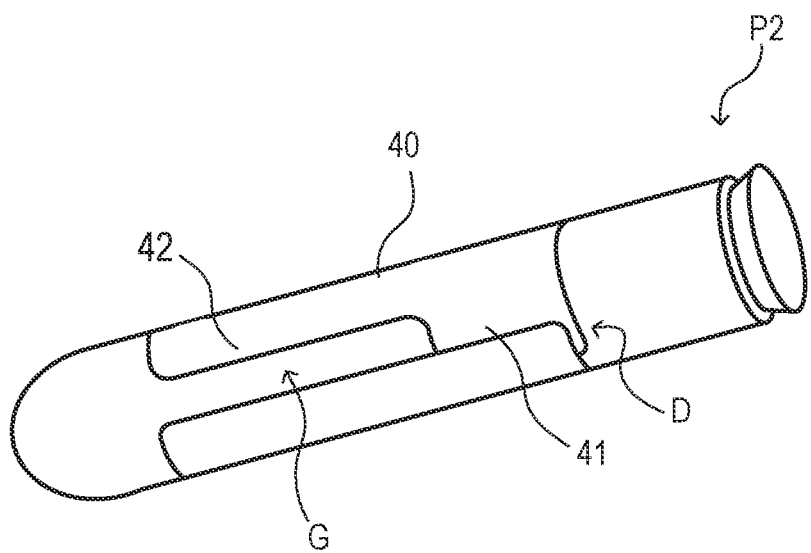
FIG. 12 is a schematic view illustrating a state in which the RFID label of the third modification is attached to a test tube.

FIG. 12 is a schematic view illustrating a state in which the RFID label 40 of the third modification is attached to a test tube P2.

Since the RFID label 40 has an L shape, when the RFID label 40 is attached to the test tube P2, as shown in FIG. 12, a gap G is generated between label end sides of the narrow portion 42. Accordingly, contents in the test tube P2 can be visually recognized.

Since the base portion 41 of the RFID label 40 covers and sticks to an entire circumference of the test tube P2, an overlap D is formed. For this reason, the RFID label 40 is less likely to peel off from a surface of the test tube P2, compared to a case where the overlap D is not formed.

As an example, when the adherend is the test tube P2, moisture or frost may be attached to the surface of the test tube P2, and it is difficult to attach an RFID label. When a diameter of the test tube P2 is particularly small, it is difficult for the RFID label to bend following the surface of the test tube P2, and thus there is a problem that the RFID label is easily peeled off from the test tube P2.

On the other hand, according to the RFID label 40 according to the third modification, the visibility of the contents can be secured by the gap G, and the difficulty of peeling off the RFID label 40 can be improved by the base portion 41 having the overlap D, and thus the RFID label 40 can be suitably applied to the tubular test tube P2.

A laminated structure of the RFID label 40 may be any of the structure shown in FIG. 2 and the structures shown in FIGS. 9 and 10.

Fourth Modification

Figure 13:
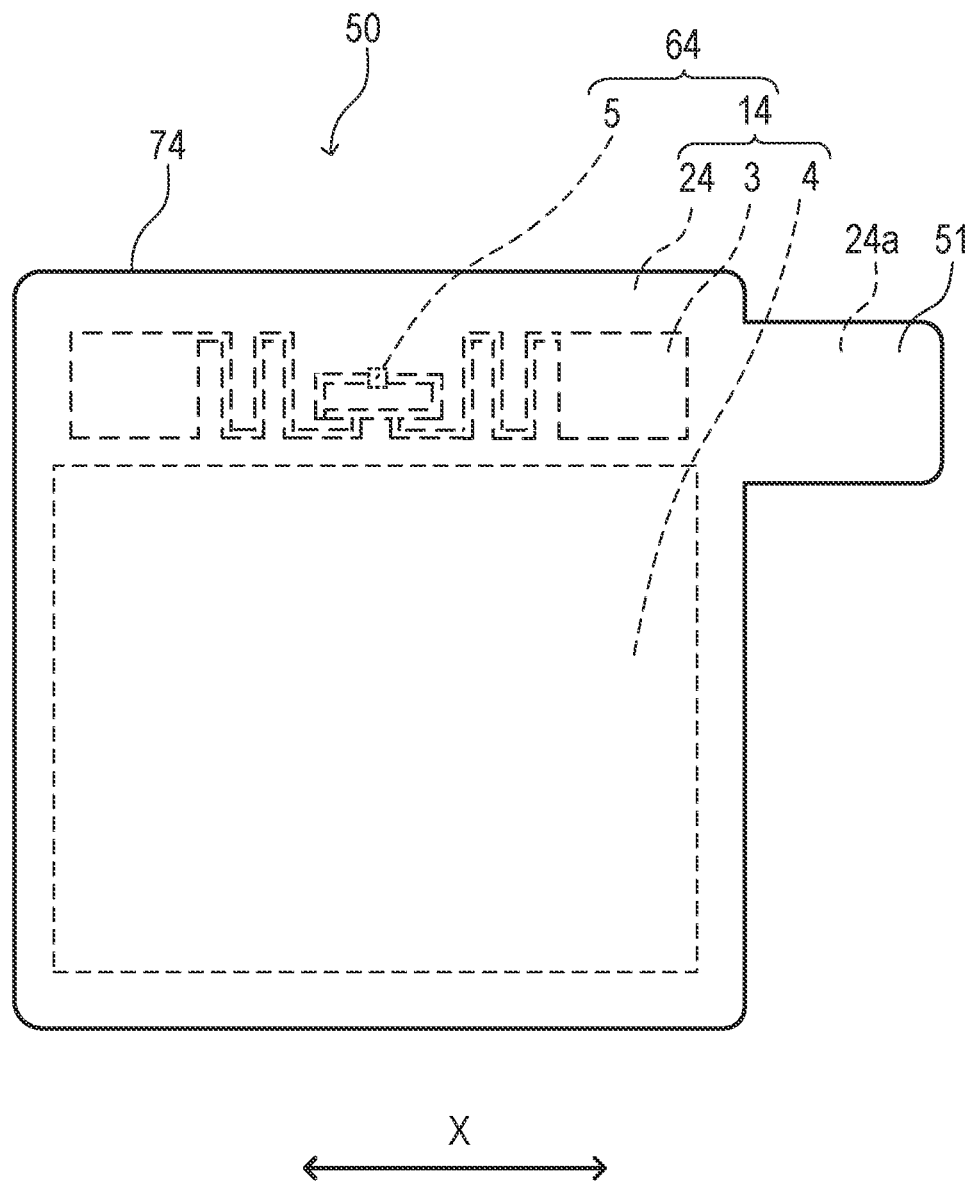
FIG. 13 is an external view of an RFID label according to a fourth modification.

FIG. 13 is an external view of an RFID label 50 according to a fourth modification.

The RFID label 50 according to the fourth modification has an external shape different from that of the RFID label 10.

The RFID label 50 has a protruding portion 51 protruding in an X direction which is a label width direction at a part of an end portion in the X direction.

In the RFID label 50 according to the fourth modification, an antenna pattern 14 includes a substrate 24 having a protruding portion 24a, the RFID antenna 3 formed on the substrate 24, and the shielding layer 4 formed on the substrate 24.

In the RFID label 50, a label substrate 74 having a shape corresponding to a shape of an RFID inlay 64 is laminated on one surface of the RFID inlay 64. Although not shown in FIG. 13, a second adhesive layer A2 to be attached to an adherend is laminated on the other surface of the RFID inlay 64.

For example, when the RFID label 50 is applied to a test tube P2, the RFID label 50 covers an entire circumference of the test tube P2, the protruding portion 51 sticks to a part of the RFID label 50, and an overlap D similar to the example shown in FIG. 12 is formed. For this reason, the RFID label 50 is less likely to peel off from a surface of the test tube P2.

A laminated structure of the RFID label 50 may be any of the structure shown in FIG. 2 and the structures shown in FIGS. 9 and 10.

OTHER EMBODIMENTS

Although the embodiment of the present invention has been described above, the above embodiment is merely a part of application examples of the present invention, and is not intended to limit the technical scope of the present invention to the specific configurations of the above embodiment.

In the present embodiment, it is sufficient that the shielding layer 4 containing a conductive material is formed in at least a part of a region other than the RFID antenna 3 of the substrate 2 constituting the RFID inlay 6, and the laminated structure constituting the RFID label is not limited to the structures shown in FIGS. 2, 9, and 10.

In FIG. 8, a use method is described in which the second RFID label 10B is attached such that a direction in which the RFID antenna 3 extends coincides with a circumferential direction of the test tube P2. However, the second RFID label 10B may be attached such that a direction in which the RFID antenna 3 extends coincides with an axial direction of the test tube P2.

The RFID label 10, the RFID label 20, and the RFID label 30 according to the present embodiment may be a linerless label to which a separator S is not temporarily attached. In this case, in the RFID label 10 and the RFID label 20, a release agent layer is provided on the surface of the label substrate 7. In the RFID label 30, the release agent layer is provided on a surface of the substrate 22 opposite to the surface on which the RFID antenna 3 is formed. Accordingly, the separator S can be made unnecessary.

In FIGS. 5 to 8, the first RFID label 10A may also be the RFID label 10. In this case, the shielding layer 4 is set to a size such that the RFID inlay 6 of the RFID label 10 can be covered.

In the present embodiment, the case where the adherend is the bag P1 or the test tube P2 has been described, but the form of the adherend is not limited thereto.

The present application claims priority under Japanese Patent Application No. 2020-158778 filed to the Japan Patent Office on Sep. 23, 2020, and the entire content of this application is incorporated herein by reference.

The invention claimed is:

1. An RFID label comprising:
an RFID inlay comprising an inlay substrate, an RFID antenna formed on a first part of the inlay substrate, and an IC chip connected to the RFID antenna;
a label substrate laminated on a first surface of the RFID inlay via a first adhesive layer;
a shielding layer, an entirety of which is formed on a second part of the inlay substrate different from the first part, the shielding layer containing a conductive material; and a second adhesive layer formed on the shielding layer; wherein:

the RFID antenna and the shielding layer do not overlap in a vertical direction.

2. The RFID label according to claim 1, wherein:
the shielding layer and the RFID antenna are formed on the same surface of the inlay substrate.

3. The RFID label according to claim 1, wherein:
the RFID antenna and the shielding layer are made of the same material.

4. The RFID label according to claim 1, wherein:
the RFID antenna and the shielding layer are made of aluminum or copper.

5. The RFID label according to claim 1, wherein:
the RFID antenna and the shielding layer are formed of conductive ink.

6. The RFID label according to claim 1, wherein:
a surface of the label substrate laminated on a surface of the inlay substrate opposite to the RFID antenna is an information recording surface.

7. The RFID label according to claim 1, wherein:
the second adhesive layer is formed on a second surface of the RFID inlay opposite the first surface.

8. An RFID label comprising:
an RFID inlay comprising an inlay substrate, an RFID antenna formed on a first part of the inlay substrate, and an IC chip connected to the RFID antenna;
a shielding layer, an entirety of which is formed on a second part of the inlay substrate different from the first part, the shielding layer containing a conductive material; and
an adhesive layer formed on the shielding layer; wherein:
the RFID antenna and the shielding layer do not overlap in a vertical direction.

9. The RFID label according to claim 8, wherein:
a surface of the inlay substrate opposite to a surface on which the RFID antenna is formed is an information recording surface.

10. The RFID label according to claim 8, wherein:
the adhesive layer is formed on the RFID inlay.

11. A method of using an RFID label in which a second RFID label is attached to an adherend to which a first RFID label is attached, wherein:
the second RFID label comprises:
an RFID inlay having an inlay substrate, an RFID antenna formed on a first part of the inlay substrate, and an IC chip connected to the RFID antenna;
a shielding layer, an entirety of which is formed on a second part of the inlay substrate different from the first part, the shielding layer containing a conductive material;
an adhesive layer formed on the shield layer; wherein:
the RFID antenna and the shielding layer do not overlap in a vertical direction; and
the second RFID label is attached to the first RFID label in an overlapping manner so as to cover the RFID inlay of the first RFID label with the shielding layer.

12. The method of using the RFID label according to claim 11, wherein:
the adhesive layer is formed on the RFID inlay.

* * * * *